United States Patent Office 3,377,199
Patented Apr. 9, 1968

3,377,199
VINYL TERPOLYMERS FOR IMPARTING CASHMERELIKE PROPERTIES TO SYNTHETIC FIBERS
Karl Altau, Waynesboro, Va., assignor to E. I. du Pont de Nemours and Company, Wilmington, Del., a corporation of Delaware
No Drawing. Continuation of application Ser. No. 836,350, Aug. 27, 1959. This application June 9, 1964, Ser. No. 373,823
6 Claims. (Cl. 117—138.8)

ABSTRACT OF THE DISCLOSURE

A vinyl terpolymer which imparts cashmerelike properties to synthetic fibers which comprises a polymer of a molecular weight of at least 2,500 and having a carbon chain with a plurality of side groups consisting of (a) about 37 to about 88 long chain alkyl groups of at least 8 carbon atoms per 200 chain carbon atoms, (b) about 3 to about 27 radicals selected from the group consisting of epoxy and methylol radicals per 200 chain carbon atoms and (c) about 10 to about 50 ionic groups per 200 carbon chain atoms. The ionic groups can be selected from ionic groups of salts of ethylenically unsaturated organic acids having a pKa value between 1 and 6 and cationic groups of salts of ethylenically unsaturated organic basis having a pKb value between 2 and 13.

---

This application is a continuation of application Ser. No. 836,350, filed Aug. 27, 1959, which is now abandoned.

The aesthetic qualities of cashmere are generally considered superior to the aesthetic qualities of other natural and synthetic fibers for many wearing apparel fabrics. The most apparent and distinctive properties of cashmere are its softness and its slick hand. Numerous efforts have heretofore been made to provide finishing agents which, when applied to synthetic fibers, or structures thereof, provide a cashmere-like hand. Presently known finishes, some of which provide the desired softness and slickness, generally are expensive or difficult to apply, are nondurable to laundering and dry cleaning, and usually are detrimental to desirable properties of the fibers such as strength, dimensional stability, uniform dyeability, resistance to soiling, etc.

It is therefore an object of the present invention to provide new vinyl polymers useful in imparting cashmere-like properties to synthetic fibers. It is a further object of the present invention to provide new vinyl terpolymer compositions which impart durable softness and slickness to fibers without adversely affecting desirable fiber properties. It is a still further object of the present invention to provide synthetic fibers, treated with said polymers, which have cashmere-like properties. It is another object to provide a process for applying the novel polymers to synthetic fibers from solutions of aqueous dispersions. Other objects will appear hereinafter.

The objects of this invention are accomplished by providing new vinyl terpolymers comprising a carbon chain having a plurality of substituent side groups consisting of: (A) a long chain alkyl group containing at least 8 carbon atoms, (B) a radical selected from the class consisting of epoxy and methylol radicals, and (C) ionic groups. The polymers of this invention may be obtained by direct interpolymerization, i.e., addition polymerization, of vinyl monomers containing the aforementioned substituents. Polymerization is carried out in the presence of a free radical catalyst system which is selected to leave the substituent groups unaffected during the polymerization with the reaction involving the replacement of the double bond in the vinyl monomers by two single bonds in the polymer chain.

In general, the polymers of this invention comprise a carbon chain having a plurality of side groups consisting of (a) from about 37 to about 88 long chain alkyl groups of at least 8 carbon atoms per 200 chain carbon atoms, (b) from about 3 to about 27 radicals selected from the group consisting of epoxy and methylol radicals per 200 chain carbon atoms, and (c) from about 10 to about 50 ionic groups per 200 chain carbon atoms selected from the class consisting of anionic groups of salts of ethylenically unsaturated organic acids having a pKa value between one and six and cationic groups of salts of ethylenically unsaturated organic bases having a pKb value between two and thirteen. The polymers have a mloecular weight of at least about 2500 and are solids at room temperature. Those having a melting point between about 90° C. and 150° C. are preferred.

The monomers which provide the aforementioned substituent groups are copolymerizable ethylenically unsaturated monomers containing a vinyl group of the formula

The new terpolymers are preferably prepared in an aqueous emulsion polymerization system in which the free radical catalyst is present. The process may be carried out batch-wise or in a continuous reactor system whereby steady state concentrations are maintained during polymerization. Emulsifying agents such as sodium lauryl sulfate, glyceryl mono-oleate, alkyl-phenoxy-polyoxyethylene ethanol, and sulfonated castor oil which are commonly used in vinyl type polymerizations may be present to stabilize the terpolymer emulsion formed.

A durable slick tactile quality is imparted to synthetic textile fibers by a process which comprises treating the fibers with an aqueous dispersion or solvent solution of the terpolymers of this invention to provide a coating of from about 0.2% to 7% by weight of the terpolymer on the fibers. Preferably, the polymers are applied to the fibers in solid form from an emulsion. The treated fibers are then subjected to a heat treatment at a temperature between 90° C. and 150° C. for about one to about thirty minutes. The heat treatment should be sufficient to bring about cross-linking of the epoxy or methylol groups of the terpolymer which results in a highly durable attachment of the polymer to the fibers. The heat treatment may be varied within the time and temperature limits specified. An acid catalyst, such as trifluoroacetic acid, sulfuric acid, hydrochloric acid, tartaric acid, p-toluene sulfonic acid, and phosphoric acid, may be utilized to accelerate the cross-linking reaction.

Throughout this application the term "epoxy" will be used to designate groups having the formula

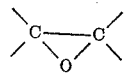

The term "methylol" will be used to designate the monovalent radical $HOCH_2-$. The epoxy-containing vinyl monomers useful in preparing the terpolymers of this invention may be represented by the formula

wherein the radical R contains at least one polymerizable vinyl group, R′ is selected from the group consisting of hydrogen, alkylene, alkyl and aryl, and R″ is selected from the group consisting of hydrogen, alkyl, and aryl.

Examples of suitable epoxide-containing vinyl monomers are: glycidyl methacrylate, allyl glycidyl ether, butadiene monoepoxide, vinyl 2,3-epoxybutyrate, 4-vinyl-cyclohexene oxide, glycidyl acrylate, vinyl 9,10-epoxystearate, 1,2-epoxy-3-(2-allylphenoxy)-propane, allyl 9,10-epoxystearate, 1,2 - epoxy - 3 - allyloxypropane, allyl-10-11-epoxyundecanoate, dicyclopentadiene monoxide, and similar epoxy-containing compounds.

Active methylol groups are provided in the polymer of this invention by including as one of the monomers in the interpolymerization reaction a vinyl monomer containing an active methylol group, e.g., activated by a carbonyl, thiocarbonyl, oxime or similar groups. Among the suitable monomers containing active methylol groups are N-methylolmaleimide, N-methylolacrylamide, N-methylol - N - vinylpiperazine, N - methylol - N - vinyl melamine, N-methylolated acrylo- and methacrylo-guanamine; N-methylolated derivatives of urea, e.g., thiourea and guanidine containing vinyl groups; and α-methylolated alkyl vinyl ketones.

The ionic group of the terpolymers of this invention may be anionic or cationic and may be provided by utilizing anionic or cationic copolymerizable vinyl monomers in the interpolymerization reaction. Vinyl monomers providing the anionic groups are selected from alkali metal, e.g., sodium, potassium and lithium, and ammonium salts of organic acids, e.g., sulfonic, carboxylic, and phosphonic acids which have a pKa value between 1 and 6. Examples of suitable salts of ethylenically unsaturated acids include potassium ethylenesulfonate, disodium itaconate, sodium acrylate, potassium 1-propenesulfonate, sodium styrenesulfonate, sodium 2-methylpropenesulfonate, sodium styrenephosphonate, disodium vinylphosphonate, and the like.

The cationic groups are supplied by inorganic acid salts of unsaturated organic bases, e.g., hydrohalide, sulfate, phosphate, and nitrate salts of basic amines. Included among the suitable amines are secondary amines such as N-allylbenzylamine, N-methylaminostyrene; tertiary amines such as N,N-diethylaminoethyl-acrylamide, N,N-diethylaminoethyl acryate, N,N-diethylaminoethyl methacrylate, N,N - diethylaminoethyl vinyl ether, dimethylallylamine; quaternary compounds such as N - trimethylaminostyrene sulfate, trimethylallylamine sulfate; and heterocyclic amines such as N - vinylimidazoline, N - vinylpyridine, allylmorpholine, N - vinylpiperidine, and the like.

The long-chain alkyl groups are provided by vinyl esters, amides, and ethers, which contain alkyl groups of at least 8 carbon atoms. Among the vinyl esters which are suitable are: vinyl n-octanoate, vinyl n-decanoate, vinyl n-octadecanoate, allyl n-octanoate, allyl n-octadecanoate, decyl acrylate, lauryl methacrylate, stearyl methacrylate, octyl acrylate, and similar species, and mixtures thereof. Examples of amide monomers are: N-octyl acrylamide, N-decyl acrylamide, N-dodecyl acrylamide, N-octadecyl acrylamide, and the corresponding methacrylamides. Examples of vinyl ethers include vinyl n-octyl ether, vinyl n-dodecyl ether, and the like.

Although the relative amounts of the three vinyl monomers comprising the terpolymers of this invention vary over fairly wide ranges, for acceptable resistance to soiling of the treated polymers it is necessary that the terpolymers contain from about 10% to about 50% by weight of the vinyl monomer containing anionic or cationic groups. The desirable softness and slickness is provided by 40% to 90% of the long-chain alkyl containing vinyl monomer, the amount being adjusted within this range to obtain optimum softness and slickness depending on the particular monomer utilized and the other copolymerizable monomers being used. For durability of the cashmerelike properties to laundering, dry cleaning, and weathering, it is necessary that at least 2% to 20% of the epoxy or methylol containing monomer be present.

As previously indicated, by coating synthetic fibers with an amount from about 0.2% to 7%, based on the weight of the dry fibers, of the terpolymer of this invention, a cashmerelike quality is imparted to the fibers.

The aesthetic qualities of cashmere, althoug subjectively obvious to the touch, are not easily measured by objective, quantitative physical tests. One test, however, which generally correlates well with subjective impressions of cashmere-like hand, is the determination of the yarn-over-yarn static coefficient of friction ($f_s$). This test is performed on a single filament, weighted at the bottom end, attached to a strain guage at the upper end and somewhere midway, wrapped about a rotating rod which is completely covered with similar filaments lying parallel to one another and parallel to the rod axis. By measuring the tension on the strain guage as the rotation of the rod increases from .005 to .8 cm./sec. over a one minute time interval, a maximum tension or stick-slip point is observed. The coefficient of static friction ($f_s$) was calculated from the belt formula:

$$\frac{T_2}{T_1} = e(f_s) A$$

where:
$T_2$ is the average maximum tension.
$T_1$ is the initial tension.
$A$ is the wrap angle in radians.

Another frictional property, differentiating cashmere from most other synthetic fibers is the "stick-slip" phenomenon, absent in cashmere but present in synthetic fibers, which is the rapid alternate sticking and slipping of fiber surfaces during movement.

The present invention is illustrated in further detail by the following examples in which parts and percentages are by weight unless otherwise indicated.

EXAMPLE I

Seventy (70) grams of octyl acrylate were mixed with 10 grams of glycidyl methacrylate in a beaker. Ten (10) drops of glyceryl mono-oleate and 5.0 grams of alkyl-phenoxy polyoxyethylene ethanol, a non-ionic emulsifier sold by General Dyestuffs Corporation under the trade name "Igepal" CO–880, were added to 234 ml. of deionized water contained in a Waring Blendor. The charge was mixed in the blendor for about five minutes. While the Waring Blendor was turning at a moderate rate of speed, the mixture of monomers was added to the blendor, followed by the addition of 20 grams of sodium styrene-sulfonate. After approximately ten minutes of vigorous stirring, the charge was transferred to a 3-neck, 500-ml., round-bottom reaction flask equipped with a mechanical stirrer, an inlet for nitrogen, and a reflux condenser. Stirring was started and 0.3 gram of potassium persulfate, 0.3% by weight based on the monomer content, was added. The system was flushed with nitrogen and 0.1 gram of sodium bisulfite, 0.1% by weight based on the monomer content, was added. Polymerization was conducted for four hours at 40° C. under a blanket of nitrogen and was complete after this time. A portion of the emulsion was coagulated by evaporation to dryness, and the coagulated polymer was washed and dried. The amount of polymer obtained indicated a 99.5% yield. Since the conversion was almost theoretical, the terpolymer composition corresponded to the monomer feed ratio, i.e., 70 parts octyl acrylate/20 parts sodium styrenesulfonate/10 parts glycidyl methacrylate. This composition was confirmed by a sulphur analysis which indicated 19.5% combined sodium styrenesulfonate. The emulsion obtained was stable for a period of several months and the polymer was shown to have retained active epoxide groups by acidification and titration.

EXAMPLE II

Thirty (30) grams of octyl acrylate were mixed with 5 grams of glycidyl methacrylate in a beaker. Two and one-half (2.5) grams of "Igepal" CO–880 and 5 drops of glyceryl mono-oleate were added to 180 ml. of deionized water contained in a Waring Blendor. The charge was mixed for five minutes. While the Waring Blendor was turning at a moderate rate of speed, the mixture of monomers was added to the blendor, followed by the addition of 15 grams of sodium acrylate contained in a freshly prepared 30% aqueous solution. After approximately ten minutes of vigorous stirring, the charge was transferred to a 3-neck, 500-ml., round-bottom reaction flask equipped with a mechanical stirrer, an inlet for nitrogen, and a reflux condenser. Stirring was started, and the system was flushed with nitrogen for fifteen minutes before 0.1 gram of α,α'-azodiisobutyronitrile, 0.2% by weight based on the monomer content, was added. Polymerization was completed after two and one-half hours at 70° C., giving a 98.2% yield of terpolymer.

EXAMPLE III

Five (5) grams of N-methylolacrylamide were dissolved in a 40:60 mixture of decyl and octyl acrylates (35 grams) contained in a 250-ml. Erlenmeyer flask. Five (5) drops of glyceryl mono-oleate from an eye dropper and 2.5 grams of "Igepal" CO–880 were added to 200 ml. of deionized water contained in a Waring Blendor. The charge was mixed for about ten minutes. While the Waring Blendor was turning at a moderate rate of speed, the monomer solution was added to the blendor, followed by the addition of 11.7 grams of sodium styrenesulfonate (85.4% pure monomer). After approximately ten minutes of vigorous stirring, the charge was transferred to a 3-neck, 500-ml., round-bottom reaction flask and polymerization was carried out in the presence of 0.3% potassium persulfate and 0.1% sodium bisulfite at 40° C. for four hours under a blanket of nitrogen, at the end of which time polymerization was complete.

A portion of the stable emulsion was coagulated by evaporation to dryness and the coagulated polymer was washed with water and then dried. A 98.4% yield of the polymer was obtained. Subsequent Soxhlet extraction of this polymer with n-heptane did not remove any polymeric matter, indicating that no acrylate homopolymer was present. Since the monomer to polymer conversion was approximately theoretical, the terpolymer composition corresponded fairly closely to the monomer feed ratio of 70 parts of decyl-octyl acrylate/20 parts sodium styrenesulfonate/10 parts N-methylolacrylamide. The composition was confirmed by a sulphur analysis which showed 19.2% sodium styrenesulfonate.

EXAMPLE IV

To a 40:60 mixture of decyl and octyl acrylates (35 grams) contained in a 250-ml. Erlenmeyer flask there were added 5 grams of glycidyl methacrylate and 7.4 grams of N,N-diethylaminoethyl acrylate. The contents of the flask were then added under moderate agitation to a Waring Blendor containing pre-emulsified glyceryl mono-oleate (5 drops from an eye dropper) and 2.5 grams of "Igepal" CO–880 in 150 ml. deionized water. To this mixture 2.6 grams of glacial acetic acid dissolved in 50 ml. of water were added. Emulsification and polymerization of the charge were carried out as described in Example I in the presence of 0.3% potassium persulfate and 0.1% sodium bisulfite, based on the weight of the monomer content, at 40° C. for four hours.

Only a trace of volatile materials was obtained when a portion of the emulsion was subjected to steam distillation. Residue from the steam-distillation pot was dried at 120° C. and extracted first with water and then with n-heptane in a Soxhlet apparatus for forty-eight hours each. Only the emulsifier added to the polymerization mixture was extracted with water and only a negligible amount of heptane soluble material was present. Since the conversion was found to be almost theoretical, 98.9%, the terpolymer composition corresponded to the monomer feed ratio of 70 parts of decyl and octyl acrylated/20 parts acetate salt of N,N-diethylaminoethyl acrylate/10 parts glycidyl methacrylate. The composition was confirmed by a nitrogen analysis which indicated 19.4% N,N-diethylaminoethyl acrylate.

Similarly, a terpolymer of 70 parts of decyl and actyl acrylates (40:60), 20 parts of the sulfate salt of N,N-diethylaminoethyl acrylate, and 10 parts of glycidyl methacrylate was prepared using 6.4 grams of N,N-diethylaminoethyl acrylate and 3.6 grams of sulfuric acid. Weight of other chemicals and polymerization conditions were the same as the ones used for the preparation of the terpolymer containing the acetate salt, as described in the first paragraph of this example.

Steam distillation of the polymer emulsion and water and n-heptane extractions of the coagulated polymer from steam-distillation pot indicated a 97.8% conversion of monomers to polymer.

EXAMPLE V

To a 40:60 mixture of decyl and octyl acrylates (35 grams) contained in a small Erlenmeyer flask there was added 5 grams of allyl glycidyl ether. Five (5) drops of glyceryl mono-oleate from an eye dropper and 2.5 grams of "Igepal" CO–880 were added to 200 ml. of deionized water contained in a Waring Blendor. The charge was mixed for about ten minutes. The monomer solution was then added to the blendor under moderate agitation followed by a 33% water solution of sodium allylsulfonate (30 grams). After approximately ten minutes of vigorous stirring, the charge was transferred to a 3-neck, 500-ml, round-bottom reaction flask. Polymerization was carried out in the presence of 0.6% potassium persulfate and 0.4% sodium bisulfite at 40° C. as described in Example I except that a period of five hours was utilized.

A portion of the resulting emulsion was subjected to steam distillation and 15% of a volatile material, based on the combined monomer feed in the polymerizer, was collected. It was identified to be a mixture of decyl and octyl acrylates. The residue in the steam-distillation pot was evaporated to dryness at 120° C. and subjected to Soxhlet extraction with water. Seventeen percent (17%) of the extracted material was soluble in water and elementary analysis showed that this was composed of 41% emulsifier and 59% of sodium allylsulfonate. N-heptane extraction of the water-insoluble polymer gave no residue upon evaporation of the hydrocarbon. Calculations showed that the terpolymer contained 72 parts of a mixture of decyl and octyl acrylates/15 parts of sodium allylsulfonate/13 parts of allyl glycidyl ether. This composition was confirmed by sulphur analyses which showed 15.3% of sodium allylsulfonate present.

EXAMPLE VI

Molten vinyl stearate (35 grams) was mixed with 5 grams of glycidyl methacrylate in an Erlenmeyer flask and the contents were added under moderate agitation to Waring Blendor containing pre-emulsified glyceryl mono-oleate (5 drops from an eye dropper) and 2.5 grams of "Igepal" CO–880 in 200 ml. of deionized water. To this 11.7 grams of sodium styrenesulfonate (85.4% pure monomer) was added. Emulsification and the polymerization of this charge were carried out as described in Example I except that 0.6% potassium persulfate and 0.4% sodium bisulfite (by weight based on monomer content) were present and the reaction mixture was held at 60° C. for five hours.

Steam distillation of a portion of the emulsion revealed that 26% of the monomers fed into the polymerizer had not entered the polymer. The volatile fraction was found to be monomeric vinyl stearate. Subsequent water extraction of the dried (at 120° C.) residue from the steam-distillation step showed that only the impurities from SSS and emulsifier were extracted. Soxhlet extraction of the water-extracted polymeric material with n-heptane yielded 22.5% polyvinyl stearate. Calculations based on conversion and n-heptane-extractibles indicated that the terpolymer composition in the polymer emulsion was 51/33/16 vinyl stearate/sodium styrenesulfonate/glycidyl methacrylate. Sulphur analysis of the extracted terpolymer indicated that the polymer contained 33.4% sodium styrenesulfonate.

EXAMPLE VII

N-octylacrylamide (35.0 grams) was mixed with 5 grams of glycidyl methacrylate in a 250-ml. Erlenmeyer flask kept on a steam-bath at about 40–50° C. Five drops of glyceryl mono-oleate from an eye dropper and 2.5 grams of "Igepal" CO–880 were added to 200 ml. of deionized water contained in a Waring Blendor. The charge was mixed for about ten minutes. The mixture of acrylic monomers was then added under moderate agitation followed by the addition of 11.7 grams of sodium styrenesulfonate (85.4% pure monomer). After approximately fifteen minutes of vigorous stirring, the charge was transferred to a 3-neck, 500-ml., round-bottom reaction flask. Polymerization was conducted in the presence of 0.3% potassium persulfate and 0.1% sodium bisulfite at 40° C. for six hours.

A portion of the emulsion was heated to dryness at 120° C. and the dried material was subjected to Soxhlet extraction with water for forty-eight hours. Evaporation of water extract gave a quantity of a solid material corresponding to the amount of emulsifier and impurities from the sodium styrenesulfonate added to the polymerizer. Soxhlet extraction for forty-eight hours on the dried, water-extracted polymer with n-heptane and evaporation of the n-heptane yielded no residue indicating that no homopolymers of acrylic species were present. Since the conversion is almost theoretical (99.6%), the terpolymer composition corresponds to the monomer feed ratio of 70 parts n-octyl acrylamide/20 parts sodium styrenesulfonate/10 parts glycidyl methacrylate. The composition was confirmed by nitrogen and sulphur analyses of the polymer.

EXAMPLE VIII

Acrylonitrile polymer staple fiber was immersed in the emulsion of Example I, diluted in water to 2% solids. The impregnated staple was squeezed to a 100% wet pickup on squeeze rolls. The treated staple was then heated at 130° C. for twenty minutes in circulating dry air to effect curing of the terpolymer finish. Spun yarns were prepared from the treated fibers and then knitted into a fabric. The knitted fabric exhibited the aesthetic qualities characteristic of cashmere. The cashmere-like qualities remained substantially unimpaired after samples were subjected to ten launderings and four dry cleanings respectively. The treated fibers were found equal to untreated fibers in soiling resistance, dyeability with basic and dispersed dyes, resistance to discoloration by heat, ultraviolet radiation and bleaching. The fabric knitted from the treated fibers was equivalent to a similar fabric knitted from untreated fibers in the properties of resilience, bulk, pilling tendency, abrasion resistance, odor retention, shrinkage, and scour and light fastness of the dyes.

EXAMPLE IX

Using the procedure of Example I, a series of terpolymers were prepared and evaluated as to their ability to impart durable cashmere-like properties to 10 count spun yarns of acrylonitrile polymer fiber staple of 3 denier and 2½″ staple length and similar yarns of polyethylene terphthalate fiber and of polyamide fiber. The terpolymer emulsions were sprayed at a 2% solids concentration to give a 100% wet pickup on the yarn. Curing was accomplished by heating the treated fibers at a temperature of 130° C. for twenty minutes in circulating dry air.

The treated yarns were submitted to subjective evaluation of aesthetic qualities, quantitative measurements of the yarn-over-yarn static coefficient of friction ($f_s$), both before and after laundering and dry cleaning and the presence of the "stick-slip" phenomenon.

TABLE

| Fiber | Terpolymer Composition | | | $f_s$ | $f_s$ After 1 Laundering | $f_s$ After 1 Dry Cleaning | Presence of Stick-Slip |
|---|---|---|---|---|---|---|---|
| A [1] (Control) | | | | 0.20 | 0.21 | 0.21 | Yes. |
| B [2] (Control) | | | | 0.21 | 0.22 | 0.22 | Yes. |
| C [3] (Control) | | | | 0.22 | 0.22 | 0.22 | Yes. |
| Cashmere (Control) | | | | 0.10 | 0.10 | 0.10 | No. |
| A | Mixture of decyl and octyl acrylates 60% (40:60). | Sodium styrenesulfonate 30%. | Glycidyl methacrylate 10%. | 0.13 | 0.14 | 0.15 | No. |
| A | Lauryl methacrylate 55% | Sodium styrensulfonate 37%. | Glycidyl methacrylate 8%. | 0.16 | 0.16 | 0.17 | No. |
| A | Octyl acrylate 45% | Sodium styrene sulfonate 45%. | Glycidyl methacrylate 10%. | 0.16 | 0.16 | 0.17 | No. |
| A | Decyl acrylate 70% | Sodium styrenesulfonate 20%. | ----- do ----- | 0.16 | 0.16 | 0.16 | No. |
| A | Mixture of decyl and octyl acrylates 70% (40:60). | ----- do ----- | ----- do ----- | 0.13 | 0.16 | 0.16 | No. |
| B | ----- do ----- | ----- do ----- | ----- do ----- | 0.13 | 0.14 | 0.14 | No. |
| A | ----- do ----- | ----- do ----- | N-methylol acrylamide 10%. | 0.12 | 0.12 | 0.14 | No. |
| A | Mixture of decyl and octyl acrylates 72% (40:60). | Sodium allylsulfonate 15% | Allyl glycidyl ether 13%. | 0.15 | 0.13 | 0.15 | No. |
| A | Vinyl stearate 51% | Sodium styrenesulfonate 33%. | Glycidyl methacrylate 16%. | 0.15 | 0.18 | 0.16 | No. |
| A | Mixture of decyl and octyl acrylates 70% (40:60). | Acetate salt of N,N-diethyl aminoethyl acrylate 20%. | Glycidyl methacrylate 10%. | 0.14 | 0.15 | 0.15 | No. |
| A | ----- do ----- | Sulfate salt of N,N-diethyl-aminoethyl acrylate 20%. | ----- do ----- | 0.14 | 0.14 | 0.14 | No. |
| A | N-Octylacrylamide 70% | Sodium styrenesulfonate 20%. | ----- do ----- | 0.13 | 0.13 | 0.15 | No. |
| C | Mixture of decyl and octyl acrylates 70% (40:60). | ----- do ----- | ----- do ----- | 0.15 | 0.15 | 0.16 | No. |

[1] Acrylonitrile fiber.
[2] Polyester fiber.
[3] Polyamide fiber.

All treated samples displayed subjective aesthetic qualities resembling cashmere, and were resistant to laundering and dry cleaning. The treated yarns were otherwise equal to the untreated yarns in those desirable properties mentioned in Example VIII.

EXAMPLE X

A copolymer was made by the process of Example I except that the ionic monomer, sodium styrenesulfonate, was omitted. The emulsion obtained was diluted to 2% solids and employed in the treatment of spun yarns of acrylonitrile polymer as in Example VIII. The treated yarns were found to exhibit a satisfactory cashmere-like quality. However, the fibers were readily susceptible to soiling with oily and dry soil to an extent far in excess of the untreated fibers.

EXAMPLE XI

A copolymer was prepared by the method of Example I except that the epoxide-containing monomer, glycidyl methacrylate, was omitted. The emulsion obtained was diluted to 2% solids and used in the process of Example VIII in treating acrylic yarns. The treated yarns obtained exhibited satisfactory cashmere-like properties but these properties were nondurable to laundering or dry cleaning.

EXAMPLE XII

A copolymer similar to that of Example X was prepared from 70 grams of octyl acrylate and 30 grams of glycidyl methacrylate. This was reacted in emulsion form with 13.2 grams of sodium sulfite (anhydrous) at room temperature for four hours at pH=10 (adjusted with dilute sodium hydroxide). The emulsion obtained was diluted to 2% solids and employed in the treatment of spun yarns of acrylonitrile polymer as in Example VIII. The treated yarns were found to exhibit a satisfactory cashmere-like quality. In addition, the fibers were resistant to soiling with oily and dry soil, and the cashmere-like quality was durable to laundering and dry cleaning.

A portion of the emulsion was coagulated by evaporation to dryness and the coagulated polymer was washed and dried. A sulfur analysis showed that this polymer contained 3.2% sulfur, indicating that approximately 10 sulfonate salt groups per 200 chain carbon atoms were present in this polymer.

Although some of the monomers illustrated in the preparation of the terpolymers of this invention possess nearly equal reactivity and thus provide an essentially theoretical conversion of the monomers to polymer, other monomers which fall within the definitions previously set forth which react at the same or different rates may be substituted for those illustrated. In each case the polymer may be analyzed by known methods and adjustments of the monomer feed rate made to provide polymers of the desired composition. In addition, the monomers may be added stepwise in the polymerization process to provide terpolymers within the scope of this invention which have block, or graft polymer structure.

Free radical catalyst systems other than those illustrated in the examples may be used, e.g., systems which include sodium or potassium chlorate and sodium bisulfite, hydrogen peroxide and a ferrous chloride, and the like. However, it is preferable that a neutral initiator such as $\alpha,\alpha'$-azodiisobutyronitrile, $\alpha,\alpha'$-azodiisobutyroamidine hydrochloride, $\alpha,\alpha'$ - azobis($\alpha$ - methyl-$_\sigma$-carboxybutyronitrile), methyl ethyl ketone peroxide, or one operable in the pH range from 3 to 9 be used in emulsion polymerization in order to prevent the premature opening of the epoxide rings when an epoxy containing monomer is included in the reaction. In the case of monomers having a methylol group, this is also necessary.

The polymerization conditions which are utilized are not critical. Generally between 0.05% and 5% of the free radical producing initiator by weight of the total polymerization materials is used. Polymerization can be carried out in the bulk, i.e., without adding diluent, or may be carried out in the presence of water or an unpolymerizable organic solvent which may or may not be a solvent for the polymer, e.g., aliphatic, cycloaliphatic, or aromatic hydrocarbons such as n-hexane, cyclohexane, benzene, toluene, xylene, and the like. The polymerization temperature may vary over a wide range, a suitable range being from 20° to 90° C. Temperatures above 120° C. should be avoided, as opening of the epoxy ring, resulting in cross-linking, may occur.

In preparing the polymers of this invention, the substituent side groups may be introduced into an existing polymer by standard procedures. For example, epoxide-producing reactions such as oxidation of a double bond with hydrogen peroxide, perbenzoic acid, peracetic acid or ozone, and treatment of a halohydrin with a strong base, may be used to introduce the epoxide groups. Alternatively, the epoxide groups may be attached to a polymer by coupling reactions involving an epoxide-containing molecule and reactive centers of the polymer, e.g., interaction of epichlorohydrin with a hydroxyl group of a polymer to produce a glycidyl group joined to the polymer. The methylol groups may be introduced into an existing polymer by standard methylol-producing reactions carried out at reactive centers on the polymer, e.g., addition of formaldehyde to amides, imides and ketones. Long chain alkyl groups may be incorporated into a polymer by suitable chemical treatments of a preformed polymer, e.g., reactions such as esterification and etherification.

When applying the polymers of this invention to the fibers from an emulsion, well-known fiber-treating materials may be incorporated in the emulsion either during or after its preparation. Suitable additives include pigments, e.g., boehmite, colloidal silica, metallic particles and the like, dyes, optical brighteners, antistatic agents, textile lubricants, dispersions of other polymers, e.g., polytetrafluoroethylene, as well as other textile additives. The added ingredients are durably retained within the cured coating and in general impart the same properties to the fiber as they ordinarily would in their normal textile uses. Water soluble oils may also be added to the emulsion to prevent interadhesion of the coated fibers and also to aid emulsion stability. About 10% of the oil, based on the coating weight, is useful and can be subsequently removed by washing without impairing the coating or any other fiber properties.

Synthetic fibers which may be treated according to the process of this invention include fibers of linear condensation polymers, e.g., polyacrylonitrile, polyamide, and polyester fibers. These fibers may be prepared from homopolymers and copolymers of acrylonitrile with copolymerizable monomers such as vinyl pyridine, vinylidene chloride, vinyl chloride, methyl methacrylate, other copolymerizable monomers of the type disclosed in Jacobson U.S. Patent 2,436,926, and copolymerizable sulfonate monomers such as the vinylarenesulfonate monomers disclosed in Andres et al. U.S. Patent 2,837,500. Fibers prepared from polymers containing at least 70% acrylonitrile are preferred. Polyamides such as those described by Carothers in U.S. Patent 2,071,253 may be treated in accordance with this invention. Polyesters and copolyesters such as those described by Whinfield et al. in U.S. Patent 2,465,319, e.g., condensation polymers of methylene glycols and terephthalic acid; mixtures of dibasic acids, e.g., terephthalic and 5-(sodium sulfo)-isophthalic acid, adipic acid, sebacic acid, bibenzoic acid, and the like, with other glycols such as 1,6-hexanediol, 1,4-cyclohexanediol, bis-(p-phenylol) ethane, resorcinol, and the like are included.

As previously indicated, the terpolymers of the present invention may be utilized in the preparation of fibers and fiber structures such as yarns, tow, roving, and knitted, woven and unwoven fabrics to impart a cashmere-like quality to such structures. Added cashmere-like quality in fabrics can be obtained by applying the polymers of this invention to essentially straight fibers which are incorporated into spun yarn structures. They may be applied to the fiber structures from emulsions, solutions, pastes or powders by dipping, spraying, or equivalent methods. When application is being made from solutions, suitable solvents include, for example, benzene, methanol, hexane, and dichloroethane.

The primary advantage of the present invention resides in providing a novel vinyl terpolymer capable of imparting cashmere-like qualities to synthetic textile fibers. This quality is imparted without loss of other desirable properties. In addition, fibers treated with the terpolymers of this invention retain their aesthetic qualities after normal use, laundering, and dry cleaning.

It will be apparent that many widely different embodiments of this invention may be made without departing from the spirit and scope thereof, and therefore it is not intended to be limited except as indicated in the appended claims.

I claim:
1. A synthetic textile material having a cashmere-like quality comprising textile fibers selected from the group consisting of polyester, polyamide and polyacrylonitrile fibers, having a durable coating, in an amount from about 0.2% to 7.0% by weight of the fiber, comprising a terpolymer of three different copolymerized vinyl monomers, said vinyl monomers consisting essentially, by weight, of (A) 40 to 90 parts of a member selected from the group consisting of vinyl n-octanoate, vinyl n-decanoate, vinyl n-octadecanoate, allyl n-octanoate, allyl n-octadecanoate, decyl acrylate, lauryl methacrylate, stearyl methacrylate, octyl acrylate, N-octyl acrylamide, N-decyl acrylamide, N-dodecyl acrylamide, N-octadecyl acrylamide, vinyl n-octyl ether and vinyl n-dodecyl ether, (B) 2 to 20 parts of a copolymerizable ethylenically unsaturated monomer selected from the group consisting of glycidyl methacrylate, allyl glycidyl ether, butadiene monoepoxide, vinyl 2,3-epoxybutyrate, 4-vinylcyclohexene oxide, glycidyl acrylate, vinyl 9,10-expoxystearate, 1,2-epoxy-3-(2-allyl-phenoxy)-propane, allyl 9,10-epoxystearate, 1,2-epoxy-3-allyloxypropane, allyl 10,11-epoxyundecanoate, dicyclopentadiene monoxide, N-methylolmaleimide, N-methylolacrylamide, N-methylol-N-vinylpiperazine, N-methylol-N-vinyl melamine, N-methylol-acryloguanamine, N-methylolmethacryloguanamine, and N-methylol-thiourea and, (C) 10 to 50 parts of a copolymerizable ethylenically unsaturated monomer, containing ionic groups, selected from the group consisting of potassium ethylenesulfonate, sodium allylsulfonate, disodium itaconate, sodium acrylate, potassium 1-propenesulfonate, sodium styrenesulfonate, sodium 2-methylpropenesulfonate, sodium styrenephosphonate, disodium vinylphosphonate, and the hydrohalide, sulfate, phosphate and nitrate salts of (1) N-allylbenzylamine, (2) N-methylaminostyrene, (3) N,N-diethylaminoethyl-acrylamide, (4) N,N-diethylaminoethyl acrylate, (5) N,N-diethylaminoethyl methacrylate, (6) N,N-diethylaminoethyl vinyl ether, (7) dimethylallylamine, (8) N-trimethylaminostyrene, (9) trimethylallylamine, (10) N-vinylimidazoline, (11) N-vinylpyridine, (12) allylmorpholine and (13) N-vinylpiperidine.

2. A synthetic textile material as in claim 1 where said polyacrylonitrile fiber contains at least 70% by weight of acrylonitrile.

3. A composition of matter comprising a terpolymer of three different copolymerized vinyl monomers, said vinyl monomers consisting essentially of (A) 40 to 90 parts of a monomer selected from the group consisting of vinyl n-octanoate, vinyl n-decanoate, vinyl n-octadecanoate, allyl n-octanoate, allyl n-octadecanoate, decyl acrylate, lauryl methacrylate, stearyl methacrylate, octyl acrylate, N-octyl acrylamide, N-decyl acrylamide, N-dodecyl acrylamide, N-octadecyl acrylamide, vinyl n-octyl ether and vinyl n-dodecyl ether, (B) 2 to 20 parts of a copolymerizable ethylenically unsaturated monomer selected from the group consisting of glycidyl methacrylate, allyl glycidyl ether, butadiene monoepoxide, vinyl 2,3-epoxybutyrate, 4-vinylcyclohexene oxide, glycidyl acrylate, vinyl 9,10-epoxystearate, 1,2-epoxy-3-(2-allylphenoxy)-propane, allyl 9,10-epoxystearate, 1,2-epoxy-3-allyloxypropane, allyl 10,11-epoxyundecanoate, dicyclopentadiene monoxide, N-methylolmaleimide, N-methylolacrylamide, N-methylol-N-vinylpiperazine, N-methylol-N-vinyl melamine, N-methylol-acryloguanamine, N-methylol-methacryloguanamine, and N-methylol-thiourea and, (C) 10 to 50 parts of a copolymerizable ethylenically unsaturated monomer, containing ionic groups, selected from the group consisting of potassium ethylenesulfonate, sodium allylsulfonate, disodium itaconate, sodium acrylate, potassium 1-propenesulfonate, sodium styrenesulfonate, sodium 2-methylpropenesulfonate, sodium styrenephosphonate, disodium vinylphosphonate, and the hydrohalide, sulfate, phosphate and nitrate salts of (1) N-allylbenzylamine, (2) N-methylaminostyrene, (3) N,N-diethylaminoethyl-acrylamide, (4) N,N-diethylaminoethyl acrylate, (5) N,N-diethylaminoethyl methacrylate, (6) N,N-diethylaminoethyl vinyl ether, (7) dimethylallylamine, (8) N-trimethylaminostyrene, (9) trimethylallylamine, (10) N-vinylimidazoline, (11) N-vinylpyridine, (12) allylmorpholine and (13) N-vinylpiperidine.

4. A coating composition comprising an aqueous emulsion of the terpolymer of claim 3.

5. A process for imparting a durable cashmere-like quality to synthetic textile fibers which comprises treating said fibers with the coating composition of claim 4 whereby an amount from about 0.2% to 7.0% by weight of said fibers of said composition adheres to the fibers, and thereafter heating the treated fibers at a temperature from about 90° C. to about 150° C. for about one to about thirty minutes.

6. A composition of matter comprising a terpolymer of three different copolymerized vinyl monomers, said vinyl monomers consisting essentially, by weight of 40 to 90 parts of a mixture of octyl and decyl acrylate, 2 to 20 parts of glycidyl methacrylate and 10 to 50 parts of sodium styrenesulfonate.

References Cited

UNITED STATES PATENTS

| | | | |
|---|---|---|---|
| 2,761,856 | 9/1956 | Suen et al. | 260—79.3 |
| 2,870,116 | 1/1959 | Vogel et al. | 260—72 X |
| 2,940,944 | 6/1960 | Christenson | 260—72 X |
| 2,998,414 | 8/1961 | West et al. | 260—80.5 |
| 3,090,704 | 5/1963 | Collins et al. | 117—138.8 |

WILLIAM D. MARTIN, *Primary Examiner.*

R. HUSACK, *Assistant Examiner.*